(12) United States Patent  
Burmeister et al.

(10) Patent No.: US 8,462,498 B2  
(45) Date of Patent: Jun. 11, 2013

(54) BATTERY DISCONNECT SCHEME FOR A PORTABLE DATA TERMINAL

(75) Inventors: Kirk Burmeister, Charlotte, NC (US); Sherri Reed, Charlotte, NC (US); Eric Linn, Fort Mill, SC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 261 days.

(21) Appl. No.: 12/969,866

(22) Filed: Dec. 16, 2010

(65) Prior Publication Data

US 2012/0155019 A1   Jun. 21, 2012

(51) Int. Cl.  
*G06F 1/16* (2006.01)

(52) U.S. Cl.  
USPC ............ 361/679.55; 320/136; 455/556.1; 429/149; 235/462.25

(58) Field of Classification Search  
USPC .......... 320/103, 115, 136, 101, 109, 104, 320/107, 137, 134; 455/557, 11.1, 343.5, 455/566, 556.1, 575.1, 90.3, 419, 466; 429/90, 429/120, 99, 61, 53, 7, 149; 361/679.43, 361/679.41, 679.01, 679.47, 679.55, 679.37, 361/679.02, 679.08, 679.17, 679.58, 679.03, 361/679.09, 679.52, 679.21, 679.33; 439/345; 600/300, 365, 16, 17, 18; 235/462.42, 462.43, 235/454, 462.25, 462.14, 462.45, 375; 165/184, 165/185  
See application file for complete search history.

(56) References Cited

U.S. PATENT DOCUMENTS

| | | | | |
|---|---|---|---|---|
| 7,495,413 | B2 * | 2/2009 | Vaisnys et al. | 320/103 |
| 2008/0123262 | A1 | 5/2008 | Coleman et al. | |
| 2009/0160400 | A1 * | 6/2009 | Woud | 320/115 |
| 2010/0069117 | A1 * | 3/2010 | Knighton | 455/557 |
| 2010/0075208 | A1 * | 3/2010 | Vaisnys et al. | 429/90 |

* cited by examiner

*Primary Examiner* — Hung Duong  
(74) *Attorney, Agent, or Firm* — Heslin Rothenberg Farley & Mesiti, P.C.

(57) ABSTRACT

A portable data terminal includes a housing; a controller operating software and supported by the housing; a battery well formed in the housing; a male connector disposed in the battery well comprised of a plurality of male contacts; a battery pack for seating in the battery well having a female connector comprised of a plurality of female contacts for electrically mating with corresponding male contacts to electrically connect the battery pack with the male connector when the battery pack is seated in the battery well, such that when the battery pack is unseated from the battery well and disconnected from the male connector, a signal male contact is electrically unmated from it's corresponding signal female contact to initiate a shut down procedure before other male contacts are electrically unmated from their corresponding female contacts, such that the other male/female contact pairs continue to provide power to the portable data terminal until shut down of the portable data terminal.

19 Claims, 5 Drawing Sheets

BATTERY DISCONNECT SCHEME FOR A PORTABLE DATA TERMINAL

BACKGROUND OF THE INVENTION

Mobile devices (also referred to as smart phones, handheld devices, handheld computers, PDAs, PDTs, etc.) are widely used worldwide, and may be described as pocket-sized computing devices, typically having a display screen with touch input or a miniature keypad. In some mobile devices the input and output are combined into a touch-screen interface. Mobile devices are popular because they provide the assistance and convenience of a conventional computer (laptop, notebook or otherwise) in environments where carrying one would not be practical. Enterprise digital assistants further extend the available functionality of mobile devices.

An Enterprise digital assistant (EDA) is a handheld computer adapted for usage with SME (Small to Medium Enterprise) and Enterprise business Application software|Applications as a data capture mobile device. Such data capture applications include indicia readers, biometrics, magnetic stripe, smart card and RFID data capture technologies used within communication networks such as WLANs (Wireless Local Area Networks), Bluetooth, Wide area network|WAN/LAN/Personal Area Network|PAN voice and data communications, VOIP and GPRS Edge Communications.

A PDT generally comprises a mobile computer, a keypad and a data acquisition device. The mobile computer generally comprises a hand held (or "pocket") computing device. Keypads come in a variety of alpha-numeric and numeric configurations. The data acquisition device generally comprises a device that captures data from, for example, radio frequency IDs (RFID), images, and bar codes. Data may also be captured via keypad entry and utilization of a touch pad associated with the mobile computer.

Typical mobile devices require either a large capacitor or some sort of secondary actuation switch to allow the mobile computers a short period of time to save data on an abrupt loss of power (i.e. battery is removed). Large capacitors, however, require a large amount of room. Some devices incorporate a battery door with an actuation switch that will shutdown the device upon removing the door, so that there is sufficient time to save data before the battery is able to be removed. An additional piece such as a battery door adds thickness to the device, along with sealing and mechanical issues surrounding how a switch is to be actuated.

Efforts regarding such systems have led to continuing developments to improve their versatility, practicality and efficiency.

It will be appreciated that for purposes of clarity and where deemed appropriate, reference numerals repeated in the figures may indicate corresponding features. Also, the relative size of various objects in the drawings may in some cases be distorted to more clearly show the invention.

DETAILED DESCRIPTION

Reference will now be made in detail to the present invention, examples of which are illustrated in the accompanying drawings, wherein like reference numerals refer to like elements throughout. The following description will use nomenclature associated with a PDT, however those of ordinary skill in the art will recognize that the present invention is applicable to a variety of other portable devices including: personal data assistants (PDAs); bar code scanners; consumer electronics (including portable radios, televisions and phones); and the like. It is anticipated that many such portable devices would benefit from the present invention, including the embodiments thereof described herein. It is to be noted that an element number followed by a letter generally indicates multiple occurrences of similar, either in structure or function elements. Further, the use of an italicized "n" (e.g. n) associated with an element number generally denotes either an unspecified one of such elements or a partial or complete group of such elements—the meaning of which is to be drawn from the context of such use.

The term Portable data terminal (PDT) refers to data collection devices used to collect, process, and transfer data to a larger data processing system. Most PDTs are ruggedized to some extent for use in industrial environments. The tougher the environment, the more robust the PDT. PDT's are available from several sources, including the assignee of the present application.

A method is here, and generally, conceived to be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs." "objects." "functions." "subroutines," "libraries," ".dlls." "APIs." and "procedures." While one or more of these terms may find favor in the present description, there is no intention to limit the invention to the described configurations.

In general, the sequences of steps in the present methods require physical manipulation of physical quantities. These quantities take the form of optical, electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

With respect to the software described herein, those of ordinary skill in the art will recognize that there exist a variety of platforms and languages for creating software for performing the methods outlined herein. Embodiments of the present invention can be implemented using MICROSOFT VISUAL STUDIO or any number of varieties of C. However, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a computer or DSP (Digital Signal Processor), but can also be implemented in a hardware processor. For example, the methods could be implemented with HDL (Hardware Design Language) in an ASIC.

In the present description, an element number followed by a letter generally indicates multiple occurrences of similar, either in structure or function, elements. Further, the use of an italicized "n" (e.g. n) associated with an element number generally denotes either an unspecified one of such elements or a partial or complete group of such elements, the meaning of which is to be drawn from the context of such use.

Figure 1A:
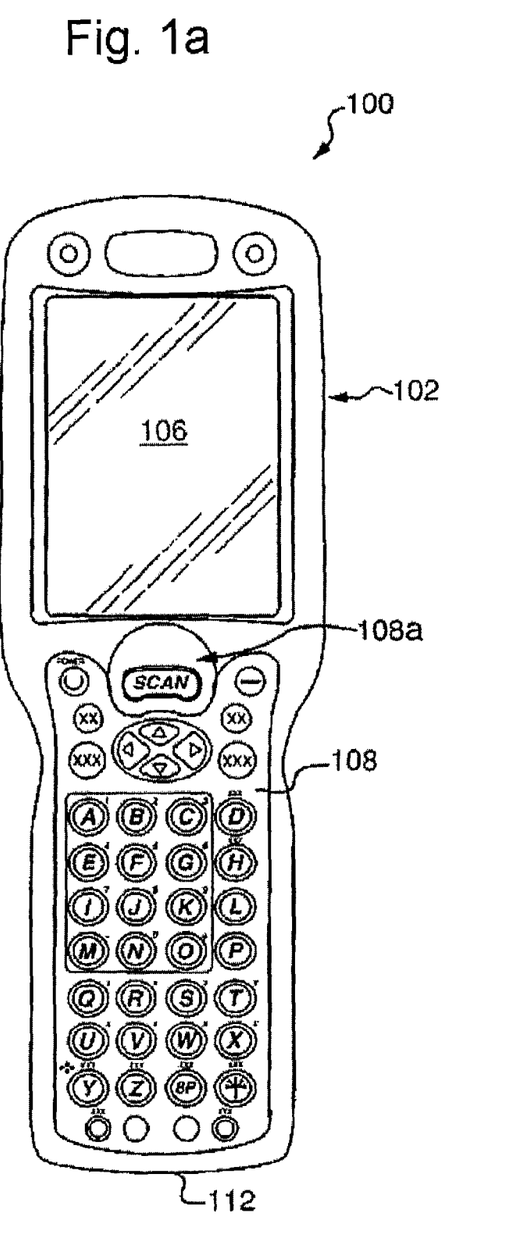
FIG. 1a is a top plan view of an exemplary PDT.
Figure 1B:
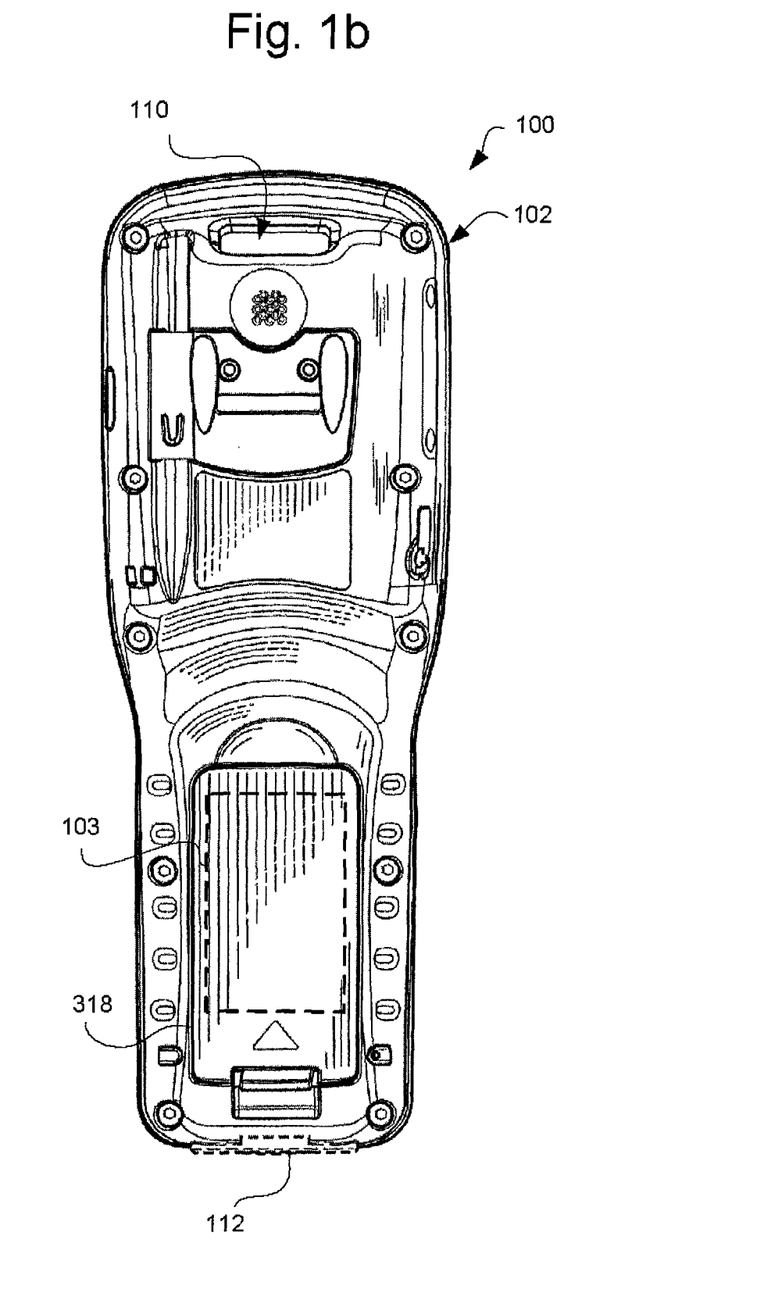
FIG. 1b is a bottom plan view of an exemplary PDT
Figure 1C:
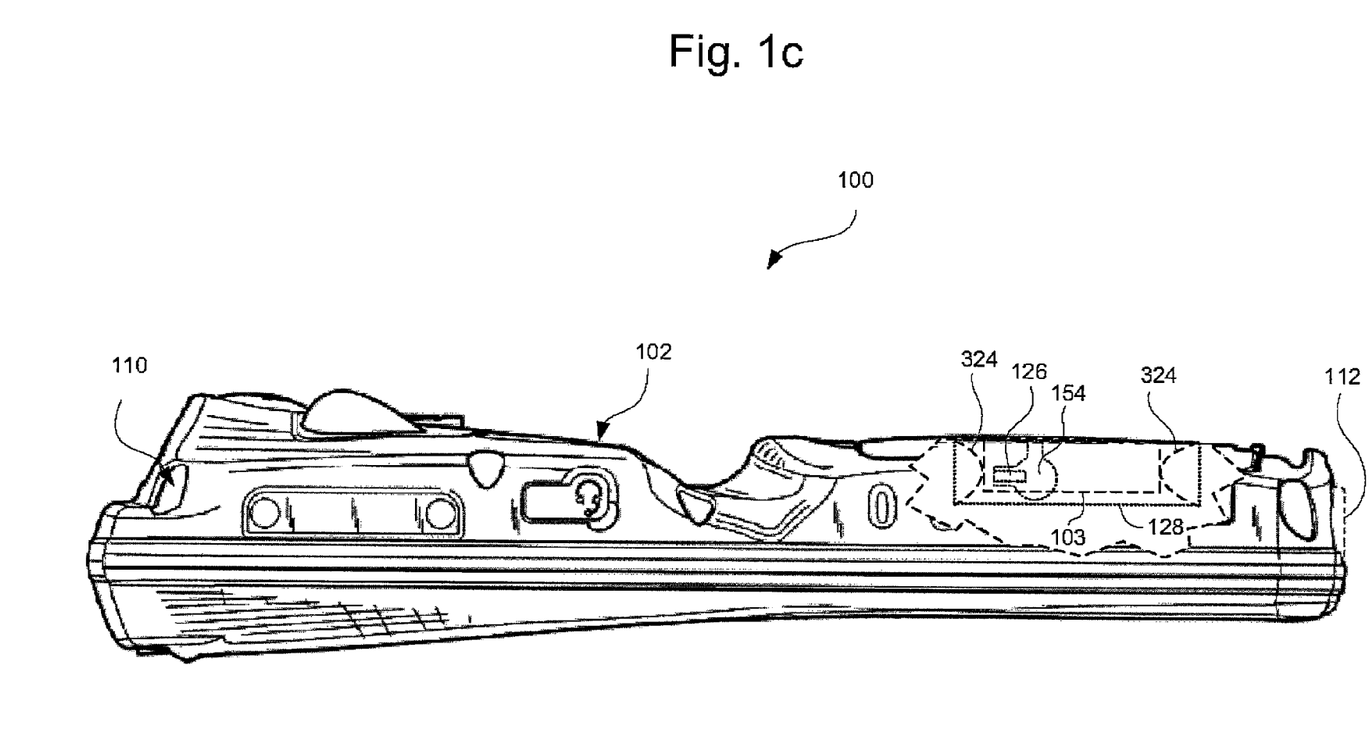
FIG. 1c is a side view, partially cutaway, of an exemplary PDT.

FIGS. 1a, 1b and 1c are views of a known PDT 100. The illustrated example utilizes a popular form factor incorporating a body 102. The body 102 generally supports a variety of components, including: a battery pack 103; an LCD with associated touch screen 106; a keyboard 108 (including a scan button 108a); a scan engine 110; and a data/charging port 112 (not fully illustrated). The scan engine 110 may comprise, for example, an image engine or a laser engine. The data/charging port 112 typically comprises an interface with one set of pins or pads for the transmitting and receiving of data and a second set of pins or pads for receiving power for powering the system and/or charging the battery.

In use, the user may actuate either the scan key 108a or the trigger 114 to initiate an image capture via the image engine 110. The captured image is analyzed. e.g. decoded. to identify the data it represents. The decoded data is stored and possibly displayed on the PDT 100. Additional processing of the data may take place on the PDT 100 and/or a data processing resource to which the data is transmitted via any available transport mechanism on the PDT 100. Some examples of known transport mechanisms utilized by PDT's include: Bluetooth, WiFi, GSM, CDMA, USB, IrDA, removable FLASH memory, parallel and serial ports (including for example, RS-232).

The battery pack 103 generally comprises a housing, one or more cells, and associated circuitry. The battery pack 103 may be located in a battery well 128. Electrically, an array of contacts (not shown) and a switch (not shown) are provided in the well. The array of electrical contacts are situated on the floor of the well. The electrical contacts may be spring biased to ensure adequate communication with the electrical contact. The switch may be engaged by a portion of a battery access panel 318. The switch may have a variety of configurations, for example it may utilize similar mechanical components as a keypad or a comprise a variety of detection circuits, e.g. mechanical, optical or magnetic. The function of the switch is to provide an indication when the battery access panel is removed.

The battery pack may be spring loaded in the well utilizing one or more spring mechanisms 324 to assist in holding the battery pack stable until removal is initiated.

In an exemplary embodiment, the housing of the battery pack 103 forms a portion of the surface of the housing 102. The battery pack 103 has a longitudinal orientation matching the longitudinal axis of the housing 102.

As a further feature, the well may be molded to have a limited number of egress points to provide water resistance. Gaskets may be utilized to render the well resistant to water. By making the well water resistant, and making the battery water resistant, the interface between the battery access panel and the well need not be made water resistant. This may reduce the cost and complexity of the PDT.

Figures 2A, 2B:
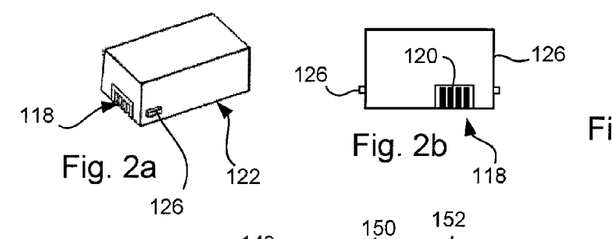
FIGS. 2a-2b are illustrations of an exemplary battery pack.

FIGS. 2a and 2b illustrate an exemplary battery pack 103 for supplying power to PDT 100 through a female type electrical connector that has a plurality of receptacles 120 for receiving electrically conductive blades or contacts of a male connector 122. Inside receptacles are female contacts 130 to make contact with the male contacts. Battery pack 103 has one or more protruding fins 126, fingers or other boss or projection utilized to lock or secure the battery pack in place when the battery pack is seated in a well 128 provided in the PDT housing.

Figure 3:
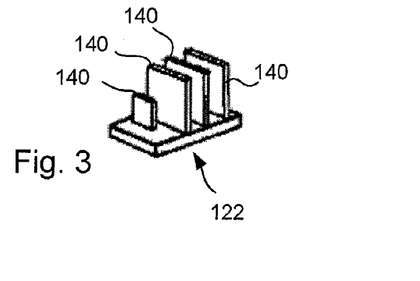
FIG. 3 is an illustration of an exemplary male connector.

FIG. 3 is an illustration of an exemplary male electrical connector 122 (not fully illustrated) having a plurality of conductive contacts for insertion into respective female connector receptacles provided the battery pack. At least one electrically conductive blade 136 is smaller than other, larger conductive blades 140. Small conductive blade 136 may be shorter or thinner or a combination thereof and have a smaller surface or contact area than the larger blade(s) 140. Electrical energy, such as power or other signal is conducted between the battery pack and the PDT.

FIGS. 4a-4d illustrate an exemplary scheme for removal of an exemplary battery pack from an exemplary PDT. FIGS. 4a-4d illustrate the battery pack seated in a well 128 of the PDT. A male connector 122 is provided in the well for connecting to a female connector in the battery pack. The male connector has at least two or a plurality of conductive blades or contacts. At least one blade 136 of which is shorter, thinner or otherwise smaller than other longer or otherwise larger than the other blades. All blades or contacts (not fully illustrated) of the male connector are in electrical contact with respective conductive female contacts 130 of the battery pack. Fins that protrude from one or more sides of the battery pack are disposed in respective or corresponding mating slots or tracks provided in the sides of the battery well. The battery well has a horizontal track 150 and a vertical track 152 extending from a rotation well 156 formed in the battery well sides which, when mated with the battery pack protrusions, form a latching mechanism to latch and release the battery pack. The rotation well has a cavity large enough to allow the battery pack fin to rotate therein. The vertical track extends to the exterior of the PDT housing.

Figures 4A, 4B:
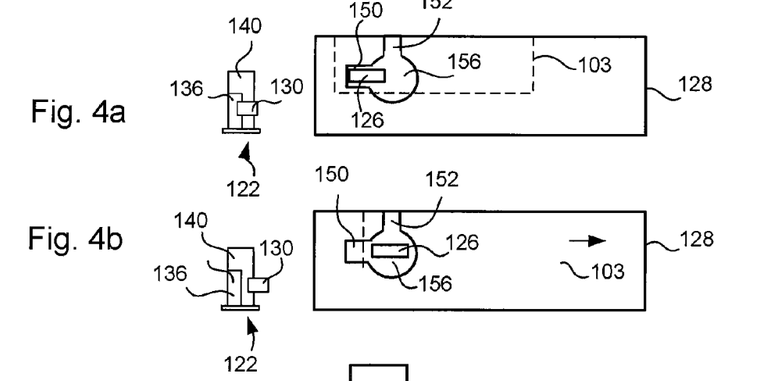
FIGS. 4a-4d are schematic illustrations of a procedure for removing a battery pack from a battery well.

FIG. 4b illustrates the battery pack in a first step of removal of the battery pack from the battery well comprising moving the battery pack away (in this example horizontally) from the male connector. Movement of the battery pack in this step disconnects or unmates the female contact from the corresponding small blade of the male connector from the male connector's small blade or contact. One or more of the remaining of the female connector contacts remain connected to (in contact with) one or more of the other, larger male blades. The fins protruding from the battery pack are concurrently or simultaneously moved out of horizontal mating slots and into a rotation cavity that is contiguous with horizontal mating slots and vertical mating slots, all of which are embossed in the sides of the battery well.

Figure 4C:
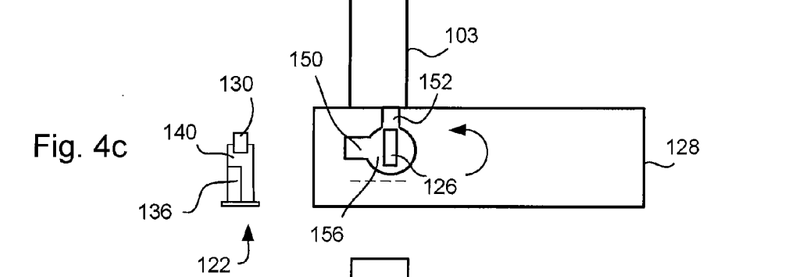

FIG. 4c illustrates a second step of removal of the battery pack from the battery well comprising rotating the battery pack with respect to the well and/or male connector. The small male blade remains out of contact or disconnected with it's corresponding female connector contact. One or more of the remaining of the female connector contacts remain connected or mated to (in contact with) one or more of the other, larger male blades. The fins protruding from the battery pack are concurrently or simultaneously rotated within rotation cavity that is contiguous with horizontal mating slots. Unmating the shorter blade contact serves as a signal to a controller to begin a shut down software routine or procedure. The blade contacts still in contact with the female connector contacts continue to power the PDT until the shut down routine is completed, thereby preventing loss of data.

Figure 4D:
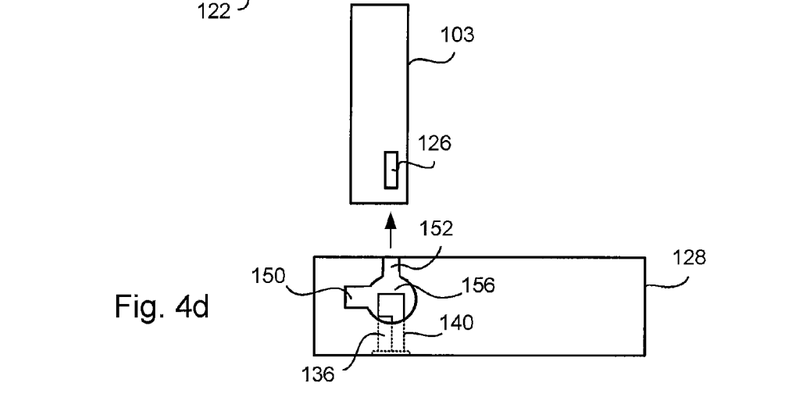
Figure 5:
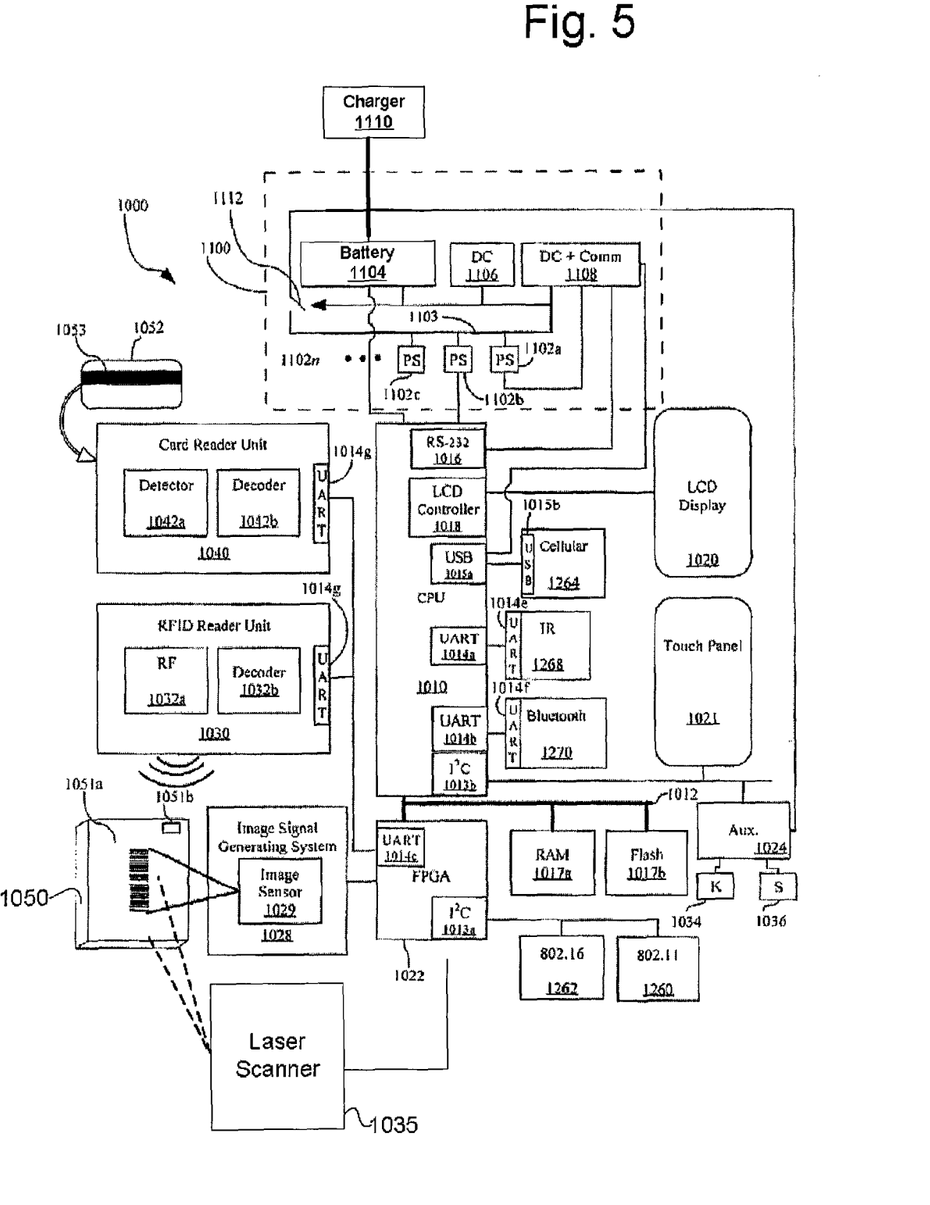
FIG. 5 is a block schematic diagram of an exemplary PDT.

FIG. 4d illustrates a third step of removal of the battery pack from the battery well comprising removing the battery completely from the battery well by moving the battery further away from male connector, in this example by moving the battery pack vertically with respect to the well and/or male connector. During this step, all of the male connector contacts, including the other larger blades are disconnected or unmated from their corresponding female connector contacts. The fins protruding from the battery pack are concurrently or simultaneously moved vertically through vertical mating slots.

In an exemplary swivelling or rotating design embodiment, a battery pack is inserted to allow for uninterrupted power during a battery removal process. The exemplary battery connector scheme allows for an integrated shutdown system during the first step of the battery removal process, meaning that a certain amount of time will elapse between the start of removal of the battery pack by disconnection or unmating of the smaller contact and the complete electrical disconnection of the battery from the PDT. Disconnection of the small contact provides a signal of a change in voltage to the processor or controller of the PDT to begin the shutdown procedure. The amount of time taken between that and complete disconnection using the exemplary configuration is enough to perform an orderly shut down of the PDT, thereby avoiding corruption of data and the risk of rendering the PDT inoperable. Mechanically, this permits the PDT to be designed without the typical shut-down capacitor (or with the use of reduced shut-down capacitor).

An exemplary male connector will have a number of blades normally used in a PDT with the addition of a smaller blade. This smaller blade will be used as the shutdown process, integrating it into a connector that is already required rather than having a separate system. Only one seal around the battery connector may be required. When a user removes the battery, they will first have to operate a locking mechanism to slide the battery slightly towards the bottom of the unit and cause the smaller blade to become disconnected, thereby signaling the system to shutdown. The remaining pins however will still be operating as normal, thereby providing power to the system to allow necessary data to be saved. The battery pack (once slid horizontally towards the bottom of the PDT) may have a pivot on the end of the connector, causing the user to have to lift opposing end of the battery for removal through a vertical slot. While the slide and pivot action is being performed, the battery continues to power the unit to provide time for the unit to shutdown properly, while keeping the amount of required components powered.

FIG. 3 is a simplified block diagram of an exemplary mobile device 1000 which may include a number of sub-systems central processing unit (CPU) 1010 which receives data from and outputs data to other sub-systems for storage, transmission and additional processing. CPU 1010 may be implemented using any number of off the shelf solutions including: embedded processors; general purpose processors; custom solutions such as pre-configured field programmable gate arrays (FPGAs) and application specific integrated circuits (ASICs). Overall operation of the CPU 1010 is controlled by software or firmware, typically referred to as an operating system, stored in one or more memory locations 1017n, including RAM 1017a and FLASH memory 1017b.

Communication to and from the CPU 1010 and the various sub-components may be via one or more ports or busses, including a main system bus 1012; I2C busses 1013a and 1013b; a plurality of Universal Asynchronous Receivers/Transmitter (UART) ports 1014n, a Universal Serial Bus (USB) 1015n, and an RS-232 port 1016.

The illustrated CPU 1010 may include a liquid crystal display (LCD) controller 1018 for controlling an LCD 1020.

A touch sensitive panel 1021, which may be in communication with one or more of the CPU 1010 and an auxiliary processor 1024 via the I2C bus 1013b, may be associated with the LCD 1020 for receipt of data thereon. The combination of the LCD 1020 and the touch sensitive panel 1021 is often referred to as a "touch screen."

A variety of secondary processors may be provided to perform general and application specific functions. The example illustrated in FIG. 3 provides two such processors: a field programmable gate array (FPGA) 1022 and an auxiliary processor 1024. The auxiliary processor 1024 may comprise any number of embedded (or general purpose) processors.

The auxiliary processor 1024 may interface with and control a variety of data input devices including, for example, the touch panel 1021, a keyboard 1034 and a scan button 1036. By way of example, the mobile device 1000 may be configured so that displayed menu options are selected by physically depressing a key on the keyboard 1034 or activating the touch screen 1021 with use of a finger or stylus. The scan button 1036 may be used for initiating and controlling the various data collection systems, such as an image signal generating system 1028, an RFID sensing system 1030, or a magnetic stripe reader 1040.

The data collection systems (e.g. the image signal generating system 1028, the RFID sensing system 1030, and the magnetic stripe reader 1050) may be controlled by one or more of the CPU 1010, the auxiliary processor 1024, and the FPGA 1022. In this case, the FPGA 1022 initiates and controls the operation of the data collection systems and accumulates data received there from prior to depositing such data in memory 1017n.

The image signal generating system 1028 generally comprises a two dimensional solid state image sensor 1029 utilizing such technologies as CCD, CMOS, and CID, for capturing an image containing data, e.g. a bar code or signature. Two-dimensional solid state image sensors generally have a plurality of photo sensor picture elements ("pixels") which are formed in a pattern including a plurality of rows and a plurality of columns of pixels. The image signal generating system 1028 further includes an imaging optics (not shown) focusing an image onto an active surface of the image sensor 1029. Image sensor 1029 may be incorporated on an image sensor IC chip having disposed thereon image sensor control circuitry, image signal conditioning circuitry, and an analog-to-digital converter. FPGA 1022 manages the capture and transfer of image data into RAM 1017n. Decoding may be performed by the CPU 1010 or any suitable secondary processor. A variety of alternatives, including a dedicated laser barcode scanner 1035 may also be utilized.

One use of the image signal generating system 1028 is for reading and interpreting bar codes such as bar code 1051a on an item 1050. For this operation, when the scan button 1036 is actuated, the CPU 1010 causes the appropriate control signals to be sent to the image sensor 1029. In response thereto, the image sensor 1029 outputs digital image data including (hopefully) an adequate representation of the bar code symbol 1050. The digital image data is streamed to the FPGA 1022 where it is collected and subsequently deposited in memory 1017n. In accordance with a decoding program (not specifically illustrated) an attempt may be made to decode the bar code represented in the captured electronic image representation. The capture and decoding of image data may occur automatically in response to a trigger signal being generated, usually by activation of the scan button 1036 or a pre-selected key on keyboard 1034. For example, the CPU 1010 may be configured, typically through execution of a program resident in memory 1017n, to continuously capture and decode bar code symbols represented therein as long as scan button 1036 is actuated. The cycle may be terminated upon successfully decoding the bar code symbol or by timing out after a number of unsuccessful attempts.

In addition to having a decode operation, the image signal generation system 1028 may also be configured for an image capture operation. In an image capture operation, control circuit 1010 captures an electronic image representation in response to the scan button 1036 being actuated without attempting to decode a decodable symbol represented therein. The captured electronic image representation may be one or more of (i) stored into a designated memory location of memory 1017*n*, (ii) transmitted to an external spaced apart device, or (iii) displayed on LCD 1020. This mode may be used to capture, for example an image of a signature or damage to a package.

In an image capture operation, the image signal generation system 1028 may be operated in two distinct stages: aiming and final capture. During the aiming stage, frames output by the image signal generation system 1028 are displayed on the LCD display 1020. These frames are not saved. Once a user is satisfied with the content of the image displayed on the LCD display 1020, he or she initiates the final capture stage. In final capture stage, a frame (either the frame currently in the buffer or a next frame) is saved and typically displayed on the LCD 1020. Generally, the aiming stage is initiated by pressing a designated button (such as a scan button 1036) with the final capture stage being initiated by releasing the designated button. It is generally desirable to display frames as quickly as possible in the aiming stage to ensure that the user is viewing a recently outputted frame. Otherwise there is a danger that the frame the user views when deciding to initiate capture is outdated and does not accurately reflect what the image signal generating system 1028 is currently outputting (and what will be captured in final capture stage).

The RFID reader unit 1030 may include an RF oscillation and receiver circuit 1032*a* and a data decode processing circuit 1032*b*. RFID reader unit 1030 may be configured to read RF encoded data from a passive RFID tag, such as tag 1051*b*, which may be disposed on article 1050.

Where the RFID reader unit 1032*a* is configured to read RF encoded data from a passive RFID tag, the RF oscillation and receiver circuit 1032*a* transmits a carrier signal to the passive tag which in turn converts the carrier energy to voltage form and actuates a transponder (not shown) to transmit a radio signal representing the encoded tag data. The RF oscillator and receiver circuit 1032*a*, in turn, receives the radio signal from the tag and converts the data into a digital format. The data decode processing circuit 1032*b*, typically including a low cost microcontroller IC chip, decodes the received radio signal information received by RF oscillator and receiver circuit 1032*a* to decode the encoded identification data originally encoded into RFID tag.

RFID reader unit 1030 may, for example, operate in a selective activation mode or in a continuous read operating mode. In a selective activation mode RFID reader unit 1030 broadcasts radio signals in an attempt to activate a tag or tags in its vicinity in response to an RFID trigger signal being received. In a continuous read mode, RFID reader module 1030 continuously broadcasts radio signals in an attempt to actuate a tag or tags in proximity with unit automatically, without module 1030 receiving a trigger signal. Mobile device 1000 may be configured so that the CPU 1010 recognizes a trigger signal under numerous conditions, such as: (1) a trigger is actuated: (2) an RFID trigger instruction is received from a remote device; or (3) the CPU 1010 determines that a predetermined condition has been satisfied.

Still further, the mobile device 1000 may include a card reader unit 1040 for reading data from a card 1052. Card reader unit 1040 generally comprises a signal detection circuit 1042*a* and a data decode circuit 1042*b*. In operation, the signal detection circuit 1042*a* detects data, from for example a magnetic strip 1053 on a card 1052. Subsequently, the data decode circuit 1042*b* decodes the data. The decoded data may be transmitted to the CPU 1010 for further processing via the FPGA 1022. The card reader unit 1040 can be selected to be of a type that reads card information encoded in more than one data format, such as magnetic stripe data, smart card or Integrated circuit card (IC card) data, and RF transmitted data.

The mobile device 1000 may further include a plurality of wireless communication system links such as an 802.11 communication link 1260, an 802.16 communication link 1262, a communication link 1264 for communication with a cellular network such as a network in accordance with the Global System for Mobile Communications (GSM), an IR communication link 1268, and a Bluetooth communication link 1270. Each of these links facilitates communication with a remote device and may be used to transfer and receive data.

An exemplary power circuit 1100 supplies power to the mobile device 1000. The power circuit 1100 generally comprises a series of power regulators 1102*n* that regulate the power supplied to the various components of the mobile device 1000. The power regulators 1102*n* each generally comprise step up or step down circuits which are in turn connected to each of the various components in the mobile device 1000 that require the particular voltage output by that power regulator 1102*n*.

The power regulators receive current from a power bus 1103 which is, in turn, supplied by an exemplary power source 1104, a first power input 1106 or a connector 1108 that includes a second power input. The first power input 1106 may comprise a DC power jack, for example, a 2.5 mm coaxial DC power plug which receives 9.5 volts from a conventional AC/DC transformer. The connector 1108 may comprise any number of known connection technologies. Certain pins of the connector 1108 may be dedicated to receiving DC power while other pins are dedicated to one or more communication paths, such as RS-232 and USB. It may also prove advantageous to provide DC power out, for example from a power supply 1102*a*, so as to power tethered accessories, such as external magnetic stripe or RFID readers (not shown). It may prove further advantageous to add circuitry to insulate the first power input 1106 from the second power input on the connector 1108 and other components in the mobile device 1000 in the event that a user attempts to supply power to both power inputs.

The power source 1104 may be charged by a charge circuit 1110 which receives power from either the first power input 1106 or the second power input on the connector 1108. Control may be provided to the CPU 1010 which may modify the charging behavior of the charge circuit 1110 based on information generated by the auxiliary processor 1024. In an exemplary embodiment, the auxiliary processor 1024 monitors parameters via an interface. A switch 1112 may control the power source based upon the presence of power from the first power input 1106 or the second power input on the connector 1108. Thus, when an external power supply is connected to either the power input 1106 or the second power input on the connector 1108, the power source is isolated from the power regulators 1102*n* and may be charged via the charge circuit 1110. Once power is removed from the power input 1106 and the connector 1108, the power source is connected to the power regulators 1102*n*.

An exemplary power source 1104 may be comprised of an energy storage system with a rapid or short charge cycle, such as a fuel cell which is at least one open electrochemical cell comprised of an anode and cathode separated by an electrolyte that converts a source fuel into an electrical current and water. It generates electricity inside a cell through reactions between a fuel and an oxidant, triggered in the presence of an electrolyte. The reactants flow into the cell, and the reaction products flow out of it, while the electrolyte remains within it. Fuel cells are thermodynamically open electrochemical cell systems that consume a reactant from an external source, which must be replenished. Many combinations of fuels and oxidants are possible. A hydrogen fuel cell uses hydrogen as its fuel and oxygen as its oxidant. Other fuels may include hydrocarbons and alcohols. Other oxidants may include chlorine and chlorine dioxide.

In an exemplary, power source 1104 may be comprised of a hybrid battery pack comprising a fuel cell and a thermodynamically closed electrochemical cell battery, such as a NiMh, NiCd, Li Ion, or Li Polymer cell battery connected to generate a single output voltage Vout.

A thermodynamically closed electrochemical cell battery, such as a NiMh, NiCd, Li Ion, or Li Polymer cell batteries generally provide the ability to drive short duration, high current loads while fuel cells provide space and weight advantages.

In another exemplary, power source 1104 may be comprised of a hybrid battery pack comprising a fuel cell and a thermodynamically closed electrochemical cell battery, such as a NiMh, NiCd, Li Ion, or Li Polymer cell battery wherein the thermodynamically closed electrochemical cell battery powers the mobile device during times of high current load requirements and the fuel cell powers the mobile device during lower current load requirements, such as steady state type conditions.

Steady state conditions may be those conditions wherein a specified characteristic of a condition, such as a value, rate, periodicity, or amplitude, exhibits only negligible change over a predetermined period of time. A steady state condition may exist after all initial transients or fluctuating conditions have damped out, and all currents, voltages, or fields remain essentially constant, or oscillate uniformly.

In another exemplary embodiment, power source 1104 may be comprised of a hybrid battery pack comprising a fuel cell and a thermodynamically closed electrochemical cell battery, such as a NiMh, NiCd, Li Ion, or Li Polymer cell battery wherein the fuel cell powers the mobile device during times of high current load requirements and the thermodynamically closed electrochemical cell battery powers the mobile device during lower current load requirements, such as steady state type conditions.

In another exemplary, power source 1104 may be comprised of a hybrid battery pack comprising a fuel cell which charges a thermodynamically closed electrochemical cell battery, such as a NiMh, NiCd, Li Ion, or Li Polymer cell battery.

In another exemplary, power source 1104 may be comprised of a hybrid battery pack comprising a fuel cell and a thermodynamically closed electrochemical cell battery, such as a NiMh, NiCd, Li Ion, or Li Polymer cell battery, wherein the fuel cell may be used to provide power to a mobile device subsystem 1 with relatively higher power requirements and the thermodynamically closed electrochemical cell battery is utilized to provide power to a mobile device subsystem 2 with relatively lower power requirements, such as subsystems that operate in more steady state type conditions.

In another exemplary embodiment, power source may be comprised of a hybrid battery pack 1104 comprising a fuel cell and a thermodynamically closed electrochemical cell battery, such as a NiMh, NiCd, Li Ion, or Li Polymer cell battery, wherein the fuel cell may be removed from the mobile device and placed into a charging station separate from the mobile device, at which time power for any onboard systems of the mobile device that need to continue in an "active" state (such as WiFi, GPS, etc) may be provided by the thermodynamically closed electrochemical cell battery.

In an exemplary embodiment, power source 1104 may be comprised of an energy storage system with a rapid or short charge cycle, such as an ultracapacitor, also known as a supercapacitor, pseudocapacitor, electrochemical double layer capacitor (EDLC) or electric double layer capacitor.

An exemplary ultracapacitor may be described and illustrated as an electrolyte suspended between two nonreactive porous electrodes (or plates or collectors) with a voltage potential applied across the collectors. In an individual ultracapacitor cell, the applied potential on a positive electrode attracts negative ions in the electrolyte, while the potential on the negative electrode attracts the positive ions. A dielectric separator between the two electrodes prevents charge from moving between the two electrodes.

As a storage device, the ultracapacitor relies on the microscopic charge separation at an electrochemical interface to store energy. Since the capacitance of these devices is proportional to the active electrode area, increasing the electrode surface area increase the capacitance, hence increasing the amount of energy that can be stored. High surface area is achieved by utilizing nanoporous material as the electrolyte, such as activated carbon or sintered metal powders. Use of nanoporous material results in an effective separation of charge despite the thin (on the order of nanometers) physical separation of the layers. The lack of need for a bulky layer of dielectric permits the packing of "plates" with much larger surface area into a given size, resulting in high capacitances in small packages.

Ultracapacitors have a high energy density when compared to common capacitors, typically on the order of thousands of times greater than a high capacity electrolytic capacitor. For example, a typical D-cell sized electrolytic capacitor will have a capacitance in the range of tens of millifarads. The same size electric double-layer capacitor would have a capacitance of several farads, an improvement of about two or three orders of magnitude in capacitance, but usually at a lower working voltage.

Ultracapacitors may not provide continuous energy for as long as thermodynamically closed electrochemical cell batteries, such as a NiMh, NiCd, Li Ion, or Li Polymer cell batteries, they may be charged faster. For example, an ultracapacitor may be charged in minutes or seconds as opposed to hours.

In an exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery connected to generate a single output voltage Vout.

In another exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery, wherein the thermodynamically closed electrochemical cell battery powers the mobile device during times of high current load requirements and the ultracapacitor provides power during lower current load requirements, such as steady state type conditions.

In another exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery, wherein the ultracapacitor powers the mobile device during times of high current load requirements and the thermodynamically closed electrochemical cell battery provides power during lower current load requirements, such as steady state type conditions.

In another exemplary embodiment, power source 1104 may be comprised of a hybrid battery pack comprised of an ultracapacitor which charges a thermodynamically closed electrochemical cell battery, such as a NiMh, NiCd, Li Ion, or Li Polymer cell battery.

In another exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery, wherein the ultracapacitor may be used to provide power to a mobile device subsystem with relatively high power requirements and the thermodynamically closed electrochemical cell battery is utilized to provide power to a mobile device subsystem with lower power requirements than subsystem, such as subsystems that operate in more steady state type conditions.

In another exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery, which charges an ultracapacitor. In most of retail wireless handheld scanner applications and transportation PDT applications, only a short cycle operation time when the unit leaves the cradle. The ultracapacity may be sufficient for sustaining the entire short cycle operation without consuming energy from rechargeable battery thus prolong the life of battery.

In another exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery, and a fuel cell, which both fuel cell and battery charge an ultracapacitor. The priority sequence for charging is that battery charges the ultracapacity first. Upon battery is low, the fuel cell charges either battery in turn charging ultracapacity or to charge ultracapacity directly. In most of retail wireless handheld scanner applications and transportation PDT applications, only a short cycle operation time when the unit leaves the cradle. The ultracapacity may be sufficient for sustaining the entire short cycle operation without consuming energy from rechargeable battery thus prolong the life of battery.

Described herein is an exemplary portable data terminal comprising: a housing; a controller operating software and supported by the housing; a battery well formed in the housing; a male connector disposed in the battery well comprised of a plurality of blade contacts, wherein at least one of the blade contacts is shorter than other longer blade contacts; a battery pack for seating in the battery well having a female connector comprised of a plurality of contacts for electrically mating with corresponding blade contacts to electrically connect the battery pack with the male connector when the battery pack is seated in the battery well, such that when the battery pack is unseated from the battery well and disconnected from the male connector, the at least one shorter blade contact is electrically unmated from it's corresponding receptacle before the longer blade contacts are electrically unmated from their corresponding receptacles.

Described herein is an exemplary portable data terminal comprising: a housing; a controller operating software and supported by the housing; a battery well formed in the housing; a male connector disposed in the battery well comprised of a plurality of male contacts; a battery pack for seating in the battery well having a female connector comprised of a plurality of female contacts for electrically mating with corresponding male contacts to electrically connect the battery pack with the male connector when the battery pack is seated in the battery well, such that when the battery pack is unseated from the battery well and disconnected from the male connector, the at least one signal male contact is electrically unmated from it's corresponding signal female contact to initiate a shut down procedure before other male contacts are electrically unmated from their corresponding female contacts, such that the other male/female contact pairs continue to provide power to the portable data terminal until the shut down procedure shuts down the portable data terminal.

Although some embodiments of the present invention have been shown and described, it will be appreciated by those skilled in the art that changes may be made in these embodiments without departing from the principles and spirit of the invention, the scope of which is defined in the claims and their equivalents.

The invention claimed is:

1. A portable data terminal comprising:
    a housing;
    a controller operating software and supported by the housing;
    a battery well formed in the housing;
    a male connector disposed in the battery well comprised of a plurality of blade contacts, wherein at least one of the blade contacts is shorter than other longer blade contacts;
    a battery pack for seating in the battery well having a female connector comprised of a plurality of contacts for electrically mating with corresponding blade contacts to electrically connect the battery pack with the male connector when the battery pack is seated in the battery well,
    such that when the battery pack is unseated from the battery well and disconnected from the male connector, the at least one shorter blade contact is electrically unmated from its corresponding receptacle before the longer blade contacts are electrically unmated from their corresponding receptacles.

2. A portable data terminal, as set forth in claim 1, wherein unmating the at least one shorter blade contact causes the software to begin a shut down procedure to shutdown the portable data terminal.

3. A portable data terminal as set forth in claim 1, further comprising a latching mechanism to secure the battery pack into the battery well.

4. A portable data terminal, as set forth in claim 3, wherein the latching mechanism is configured such that a user must move the battery in a horizontal direction, rotate the battery into vertical alignment, and move the battery in a vertical direction to remove the battery pack from the portable data terminal.

5. A portable data terminal as set forth in claim 3, wherein the latching mechanism is comprised of a protrusion from the battery pack.

6. A portable data terminal as set forth in claim 3, wherein the latching mechanism is comprised of a horizontal track and a vertical track extending from a rotation well formed in at least one side of the battery well.

7. A portable data terminal as set forth in claim 3, wherein the latching mechanism is comprised of a protrusion from the battery pack that mates with a horizontal track and a vertical track extending from a rotation well formed in a side of the battery well.

8. A portable data terminal as set forth in claim 1, further comprising a pivot on which the female connector is rotated.

9. A portable data terminal as set forth in claim 1, further comprising at least one contact spring for biasing at least one blade contact.

10. A portable data terminal as set forth in claim 1, wherein unmating the at least one shorter blade contact serves as a signal to a controller to begin a shut down.

11. A portable data terminal comprising:
  a housing;
  a controller operating software and supported by the housing;
  a battery well formed in the housing;
  a male connector disposed in the battery well comprised of a plurality of male contacts;
  a battery pack for seating in the battery well having a female connector comprised of a plurality of female contacts for electrically mating with corresponding male contacts to electrically connect the battery pack with the male connector when the battery pack is seated in the battery well,
  such that when the battery pack is unseated from the battery well and disconnected from the male connector, at least one signal male contact is electrically unmated from its corresponding signal female contact to initiate a shut down procedure before other male contacts are electrically unmated from their corresponding female contacts, such that the other male/female contact pairs continue to provide power to the portable data terminal until the shut down procedure shuts down the portable data terminal.

12. A portable data terminal as set forth in claim 11, further comprising a latching mechanism to secure the battery pack into the battery well.

13. A portable data terminal, as set forth in claim 11, wherein the latching mechanism is configured such that a user must move the battery in a horizontal direction, rotate the battery into vertical alignment, and move the battery in a vertical direction to remove the battery pack from the portable data terminal.

14. A portable data terminal as set forth in claim 12, wherein the latching mechanism is comprised of a protrusion from the battery pack.

15. A portable data terminal as set forth in claim 12, wherein the latching mechanism is comprised of a horizontal track and a vertical track extending from a rotation well formed in at least one side of the battery well.

16. A portable data terminal as set forth in claim 12, wherein the latching mechanism is comprised of a protrusion from the battery pack that mates with a horizontal track and a vertical track extending from a rotation well formed in a side of the battery well.

17. A portable data terminal as set forth in claim 11, further comprising a pivot on which the female connector is rotated.

18. A portable data terminal as set forth in claim 11, further comprising at least one contact spring for biasing at least one blade contact.

19. A portable data terminal as set forth in claim 11, wherein unmating the at least one signal male contact serves as a signal to a controller to begin the shut down procedure.

* * * * *